UNITED STATES PATENT OFFICE.

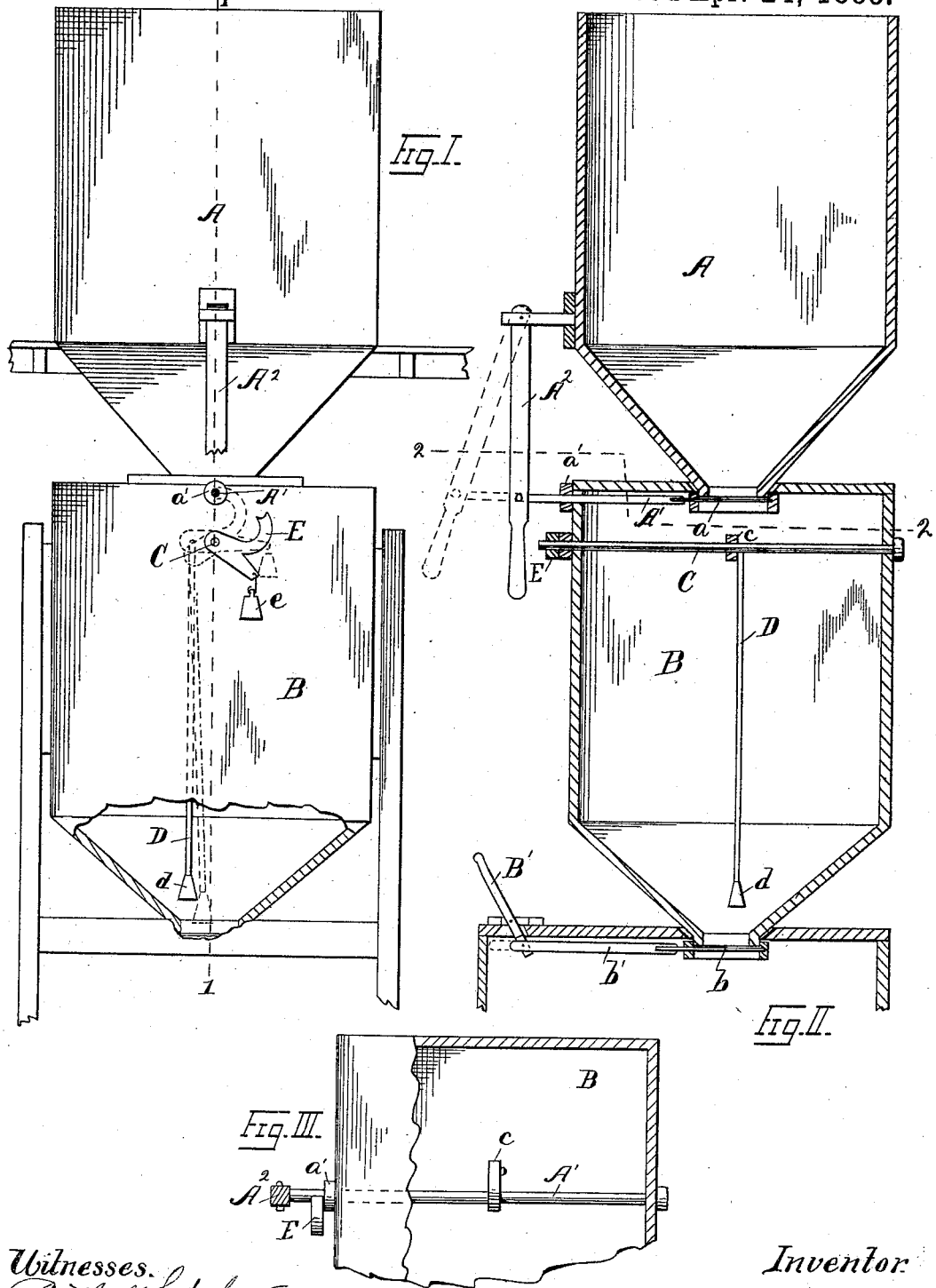

PATRICK E. CANFIELD, OF CHICAGO, ILLINOIS, ASSIGNOR OF ONE-HALF TO ALEXANDER W. POND, OF SAME PLACE.

AUTOMATIC LATCH FOR GRAIN-GARNERS.

SPECIFICATION forming part of Letters Patent No. 381,528, dated April 24, 1888.

Application filed November 21, 1887. Serial No. 255,637. (No model.)

*To all whom it may concern:*

Be it known that I, PATRICK E. CANFIELD, a citizen of the United States, residing at Chicago, in the county of Cook and State of Illinois, have invented a certain new and useful Improvement in Automatic Latches for Grain-Garners, which is fully set forth in the following specification, reference being had to the accompanying drawings, in which—

Figure 1 is a side elevation of an apparatus embodying my invention, the lower portion of the weighing-hopper being shown in section; Fig. 2, a sectional view of the same, taken on the line 1 1 of Fig. 1; and Fig. 3, a detail plan section taken on the line 2 2 of Fig. 2.

Like letters refer to like parts in all the figures of the drawings.

My invention relates to automatic latches for grain-garners, and has for its object to provide a mechanism whereby the valve of the grain-garner will be automatically locked in a closed position until all of the grain contained in the weighing-hopper has been discharged therefrom.

I will now proceed to describe a construction in which I have practically carried out my invention in one form, and will then particularly point out in the claims those features which I deem to be new and desire to secure by Letters Patent.

In the drawings, A represents the garner or receiving-hopper of an elevator, the discharge-aperture of which is controlled in the usual manner by a sliding valve, $a$, operated by a valve-rod, A'.

A² represents a lever connected to the valve-rod to operate the same.

B represents the weighing-hopper, constructed and mounted in the usual manner, and having its discharge-orifice controlled by a valve, $b$, connected by a valve-rod, $b'$, to an operating-lever, B'. These parts may be of any approved construction, as their particular form and mode of operation form no part of my present invention.

C represents a rock-shaft mounted in the upper portion of the weighing-hopper B, and extending across the same in a position parallel to the valve-rod A'.

D represents a rod, rope, or chain connected to the rock-shaft C in any suitable manner to operate the same, and preferably in the manner shown, in which the rock-shaft is provided with an arm, $c$, to which the upper end of the rod or rope D is attached. The lower end of the rod or rope D hangs in close proximity to the discharge-orifice of the weighing-hopper, and is preferably provided with a weight or bob, $d$, which may have either the conical form shown or any other suitable configuration. Upon the outer end of the rock-shaft C is arranged a latch, E, which is adapted, when swung up into the position shown in dotted lines in Fig. 1 of the drawings, to come into contact with the valve-rod A'. This valve-rod is provided with a collar or enlargement, $a'$, which, when the valve is closed, is just in the rear of the plane of motion of the latch E, so that when the said latch is swung up in the manner just described it will pass in front of the said collar or enlargement and prevent any motion of the valve-rod. A counter-weight, $e$, may be attached to the latch E, or to the rock-shaft C, to hold the said latch down in case its own weight is not sufficient for this purpose.

In the operation of weighing grain the garner or receiving-hopper A receives a constant supply of grain and there is drawn therefrom from time to time a quantity of grain which is discharged into the weighing-hopper B. When the weighing-hopper has received a proper quantity of grain, the valve of the garner is closed, and the grain in the weighing-hopper having been duly weighed the valve of the said hopper is then opened and the grain contained therein is discharged into the vessel, car, bin, or other receptacle for which it is destined. In carrying out these operations it frequently occurs that the amount of grain thus delivered is either too great or too small. The former of these errors may occur from the fact that the tallyman, whose duty it is to attend the garner A, opens the valve thereof before all the grain in the weighing-hopper has been discharged, so that a portion of the grain in the garner passes directly through the weighing-hopper and is delivered without being weighed. The latter error may occur owing to the fact that some of the grain in the weighing-hopper is not discharged, owing to a stoppage of the flow from any cause, and is consequently reweighed along with the next charge from the garner, thus leaving the previous charge short to the amount retained. These errors both occur through the premature opening of the valve of the garner before all the grain in the weighing-hopper has been discharged. The principal object of my present invention is to render errors from this cause impossible, and this result is accomplished in the following manner: When a charge has been drawn from the garner into the weighing-hopper and duly weighed, the valves of both hoppers being of course closed during the weighing operation, the valve of the weighing-hopper is opened and the grain therein passes down and out through the discharge-orifice. This downward movement carries along with it the rod or rope D, the suction of the grain being sufficient to effect this result. As hereinbefore stated, I prefer to employ the conical weight or bob $d$ on the end of the rod or rope D, since it insures certainty of action; but this weight or bob may be dispensed with. The downward motion of the grain carries the rod down into the position shown in dotted lines in Fig. 1 of the drawings, thereby rotating the rock-shaft C and carrying the latch E up into the position shown in dotted lines in Fig. 1. When in this position, the latch bears upon the valve-rod A' of the garner immediately in front of the collar or enlargement $a'$, and thereby securely locks the valve of the garner. The latch is held in this position until all of the grain in the weighing-hopper has passed out of the same, and it will therefore be seen that until the entire charge in the weighing-hopper is discharged therefrom it will be impossible to open the valve of the garner through negligence or mistake. When the grain has been entirely discharged from the weighing-hopper, the counter-weight $e$ throws the parts back into position shown in full lines in Fig. 1 of the drawings, and thereby frees the valve of the garner, at the same time indicating in an obvious manner that the weighing-hopper is emptied.

It is obvious that various modifications in the details of construction may be made without departing from the principle of my invention. For instance, instead of employing a collar or enlargement on the valve-rod of the garner, the said rod may be constructed in any suitable way which will permit the latch to engage therewith to lock the same. Moreover, the particular connection between the operating rod or rope D and the latch may obviously be varied without departing from the principle of my invention. I therefore do not wish to be understood as limiting myself strictly to the precise details hereinbefore described, and shown in the drawings.

Having thus described my invention, what I claim as new, and desire to secure by Letters Patent, is—

1. The combination, with the weighing-hopper, of the garner or receiving-hopper, a valve for closing the said garner, means for operating said valve, and an automatic latch operated by the descent of the grain from the weighing-hopper to lock the said valve and prevent its being moved, substantially as and for the purposes specified.

2. The combination, with the weighing-hopper, of the garner or receiving-hopper, a valve for closing the garner, means for operating said valve, a latch to lock said valve and prevent its being operated, and a rod, rope, or chain connected to said latch to operate the same and arranged within the weighing-hopper with its lower end in close proximity to the discharge-orifice thereof, substantially as and for the purpose specified.

3. The combination, with the garner and its valve and valve-rod, of a latch adapted to engage the said valve-rod to lock the valve, and a rod, rope, or chain connected to the said latch to operate the same and arranged within the weighing-hopper with its lower end in close proximity to the discharge-orifice thereof, substantially as and for the purposes specified.

4. The combination, with the garner and its valve and valve-rod, of the weighing-hopper, the rock-shaft provided with a latch to engage the said valve-rod, and a rod, rope, or chain connected to the rock-shaft, and having its lower end arranged in close proximity to the discharge-orifice of the weighing-hopper, substantially as and for the purposes specified.

5. The combination, with the garner and its valve and valve-rod, of the weighing-hopper, the rock-shaft mounted in said hopper and provided with a weighted latch to engage the valve-rod of the garner, and a rod, rope, or chain connected to the rock-shaft to operate the same, arranged within the weighing-hopper, and provided at its lower end with a weight or bob arranged in close proximity to the discharge-orifice of the weighing-hopper, substantially as and for the purposes specified.

PATRICK E. CANFIELD.

Witnesses:
A. W. POND,
IRVINE MILLER.